Dec. 1, 1942. H. DREYFUS 2,303,339
MANUFACTURE OF ARTIFICIAL MATERIALS
Filed Oct. 3, 1939
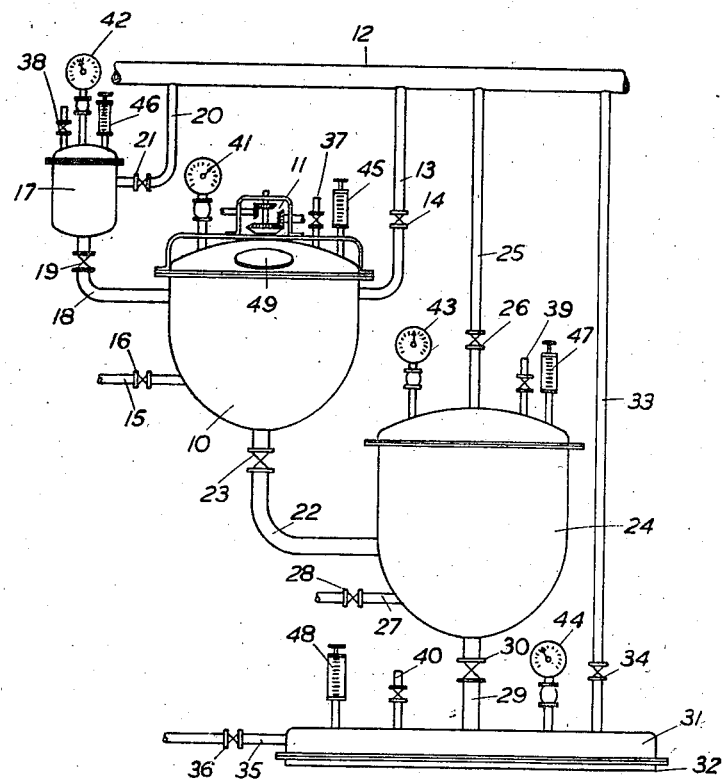
H. DREYFUS
INVENTOR
ATTORNEYS Patented Dec. 1, 1942

2,303,339

UNITED STATES PATENT OFFICE 2,303,339

MANUFACTURE OF ARTIFICIAL MATERIALS

Henry Dreyfus, London, England, assignor to Celanese Corporation of America, a corporation of Delaware Application October 3, 1939, Serial No. 297,680
In Great Britain October 18, 1938

14 Claims. (Cl. 18—55)

This invention relates to the manufacture of artificial materials and especially to the manufacture of moulding powders, thermoplastic sheet materials and other plastics.

In the production of moulding powders and other plastics, it is usual to introduce a plasticizer for the thermoplastic base in the form of a solution of said plasticiser in a volatile solvent therefor and subsequently to remove the volatile solvent. This involves considerable expense since not only is some of the volatile solvent inevitably lost but also the thermoplastic products must be subjected to a protracted "seasoning" treatment to remove residual volatile solvent if subsequent warping of the products is to be avoided. The present invention enables a considerable economy to be effected in the manufacture of products of the kind referred to.

According to the present invention products having a basis of a synthetic thermoplastic film-forming compound are made by a process wherein a molten composition containing the thermoplastic compound and a plasticiser therefor and free from volatile solvents for the thermoplastic compound is maintained in the molten state below the surface of a non-solvent liquid in a closed space, and is shaped and/or displaced from said space by pressure exerted on the non-solvent liquid. The invention is of special importance in connection with thermoplastic compounds which decompose when heated in air to temperatures not far removed from their melting point.

In one method of carrying out the invention, the thermoplastic compound, for example cellulose acetate, cellulose acetate-propionate, cellulose acetate-butyrate or other organic derivatives of cellulose, is heated under the surface of water in a closed vessel and the plasticiser is introduced in finely divided form and dispersed with the thermoplastic compound in the body of hot water. The dispersion, which should be sufficiently coarse to ensure rapid settling, is allowed to settle, preferably in a separate heated closed vessel, and the intimate mixture of thermoplastic base and the plasticiser is then extruded, under pressure transmitted through the hot water, into a mould or through a die according to the nature of the product required. The pressure necessary for extrusion may be obtained by pumping a further quantity of hot water into the vessel or by supplying live steam or compressed air thereto.

Preferably, the temperature in the closed vessel or vessels is sufficiently high to melt the thermoplastic compound. It is of advantage to introduce the plasticiser into the body of hot water above the thermoplastic compound, in atomised form. The closed vessel is provided with stirring means and after the thermoplastic base and the plasticiser have been dispersed to the desired extent the dispersion is expelled under water pressure into the settling vessel, also maintained at a temperature high enough to keep the thermoplastic base molten.

When the object is to produce a moulding powder, this is effected by expelling the molten layer of thermoplastic material containing plasticiser from the settling vessel through dies situated below the level of said molten layer so that the thermoplastic material emerges in the form of filaments or rods which can readily be broken up into powder or may even break up into powder under their own weight.

When moulded articles are required the liquid layer of thermoplastic compound and plasticiser is extruded directly from the settling vessel into a mould of suitable shape. Sheet materials can be made in this way by extruding the molten layer into a shallow straight-sided closed mould, the lower interior surface of which is accurately flat to ensure the flatness of the lower surface of the sheet. The molten material is forced into the mould by means of hot water under considerable pressure. Alternatively, a moulding powder may be fed into the mould by any suitable means and melted in situ under the surface of hot water under pressure. If desired, a diaphragm or other flexible member or a layer of a water-insoluble liquid incompatible with the thermoplastic base and of density intermediate between that of water and that of the thermoplastic material may be used to prevent contact between the material and the water while transmitting the pressure of the water to the material. After cooling, the sheets or other articles are removed from the moulds, dried and if desired polished in the dry condition or by the application of small quantities of volatile solvents.

One form of apparatus for producing sheet material according to the invention is shown diagrammatically in elevation in the accompanying drawing.

The pressure vessel 10 is provided with robust double effect stirring apparatus, the drive to which is shown at 11. Live steam from the main 12 can be introduced through the pipe 13 provided with a stop valve 14 and water can be introduced by the pipe 15 provided with stop valve 16. Plasticiser can be forced into the vessel 10 from the pressure vessel 17 through the pipe 18 provided with stop valve 19 by introducing steam from the main 12 into the vessel 17 through the pipe 20 provided with stop valve 21. The pipe 18 extends into the vessel 10 and is perforated within the vessel so as to produce a spray of the plasticiser.

The vessel 10 has an outlet 22 provided with stop valve 23 and communicating with the settling vessel 24 which also can be supplied with live steam through the pipe 25 controlled by stop valve 26. Water can be supplied to the vessel 24 through the pipe 27 controlled by stop valve 28. The vessel 24 has an outlet 29 provided with stop valve 30 and extending through the cover 31 of the mould 32 whereby the molten composition can be introduced into the mould space below the surface of the water.

Live steam can be introduced into the mould 32 through the pipe 33 controlled by stop valve 34 and water can be introduced by the pipe 35 controlled by stop valve 36.

The four vessels 10, 17, 24 and 32 are provided with valves 37, 38, 39 and 40 respectively for equalising the pressure inside and outside the vessels when necessary, with pressure gauges 41, 42, 43 and 44 respectively and with spring-loaded relief valves 45, 46, 47 and 48 respectively.

In operation the cellulose derivative, e. g., cellulose acetate, cellulose acetate-propionate or cellulose acetate-butyrate, is fed into the vessel 10 through the manhole 49 which is then closed and water is introduced by opening the valve 16, the valve 37 being also open, so as completely to cover the cellulose derivative. The valves 16 and 37 are then closed and the valve 14 is opened so admitting live steam to the vessel. The relief valve 45 is set for such a pressure (below the pressure in the main 12) as will give a steam temperature sufficient to produce at least incipient melting of the cellulose derivative. The stirring gear is then set in operation and by opening the valves 21 and 19, the relief valve 46 being set at a higher pressure than 45 (but still at a pressure below the main 12) and the valve 14 being adjusted to give a slight flow of steam for the relief valve 45, plasticiser, e. g., dimethyl phthalate or diethyl phthalate, is blown from the vessel 17 into the vessel 10. When the desired amount, e. g., 15-30 or 40% on the weight of the cellulose derivative, of plasticiser has been introduced in this way the valves 19 and 21 are closed. Operation of the stirring gear is continued until a fine suspension of the cellulose derivative and plasticiser in water has been obtained. Meanwhile, the vessel 24 is partly filled with water by opening the valve 28, the valve 39 also being open. These valves are closed and by opening the valve 26 steam is introduced into the vessel 24 to raise it to a temperature sufficient to maintain the composition which is to be introduced from the vessel 10 in a molten condition; the relief valve 47 is set at a slightly lower pressure than 45. The suspension of the cellulose derivative and plasticiser is transferred from the vessel 10 to the settling vessel 24 by opening the valve 23 and is allowed to remain in the vessel 24 until the molten mixture of cellulose derivative and plasticiser has settled out as a layer beneath the water. Meanwhile, water has been introduced into the mould 32 by opening the valve 36, the valve 40 being open, and after closing these valves the mould has been raised to a temperature slightly lower than that in the vessel 24 but, sufficient to keep the cellulose derivative-plasticiser composition molten, by opening the valve 34 to admit steam to the mold. The valve 30 is then opened to admit the composition to the mould. After closing this valve the valve 40 is gradually opened to reduce the steam pressure in the mould and the mould is allowed to cool, after which the mould is withdrawn from the cover and the sheet material removed. A fresh mould may then be brought into position and the valve 30 re-opened to cast a further sheet.

Differently shaped articles can be moulded by substituting moulds of appropriate shape. When filaments or rods of the composition are required the outlet 29 is connected directly with a suitable die, the mould and mould-cover being removed.

The process of the invention is applicable to a large range of thermoplastic base materials, among which many may be made of organic esters of cellulose such as cellulose acetate, cellulose propionate, cellulose butyrate, esters of cellulose containing inorganic radicles, for example, cellulose nitrate, cellulose nitrate-acetate, cellulose nitrate-propionate, ether-esters of cellulose such as ethyl cellulose acetate and oxyethyl cellulose acetate, cellulose ethers such as ethyl- and benzyl cellulose, polyvinyl esters and ethers, for example, polyvinyl acetate, polyvinyl chloride, polyvinyl chloracetate and co-polymers of vinyl acetate and vinyl chloride and similar polymerised unsaturated esters and ethers, for example, those of the acrylic and methacrylic series. The invention if of particular importance in connection with thermoplastic materials having a basis of cellulose acetate or of mixed lower fatty acid esters of cellulose, e. g., cellulose acetate-propionate and cellulose acetate-butyrate. Esters containing 2-2½ acetyl groups and ⅛-½ propionyl or butyryl groups per $C_6H_{10}O_5$ unit of cellulose are especially suitable.

As plasticisers which may be used in the process, using cellulose acetate or a mixed ester containing the acetyl radicle as the thermoplastic base, mention may be made of esters of polyhydric alcohols, e. g., triacetin, diacetin and diglycerine tri-ether; phthalic acid esters such as dimethyl phthalate, diethyl phthalate, dibutyl phthalate, dimethyl glycol phthalate, diethyl glycol phthalate, ethyl phthalyl glycolate, methyl phthalyl methyl glycolate; phosphoric esters such as triphenyl phosphate, tricresyl phosphate and trichlorbutyl phosphate; tartaric acid esters, for instance, dimethyl tartrate, diethyl tartrate and dibutyl tartrate; sulphonamides, for example, paratoluene sulphonamide and the similar xylene sulphonamides; and aromatic ketones such for example as acetophenone and benzophenone. These plasticisers are of particular utility with cellulose acetate but may be used with other thermoplastic bases, especially other organic derivatives of cellulose.

Synthetic resins, fillers, pigments and the like may be introduced before, after or during the introduction of the plasticiser. Thus, for example, in the case of cellulose acetate, fusible synthetic resins which are compatible therewith, for example, resins of the sulphonamide-formaldehyde class, of the polynuclear phenol-ketone class, of the polynuclear phenol-formaldehyde class or of the polyhydric alcohol-polybasic acid class can be incorporated with the cellulose acetate in molten form.

It is of advantage for the plasticisers, synthetic resins or other agents to be incorporated with the thermoplastic base to be insoluble or of low solubility in water.

The water used in incorporating the plasticiser in the thermoplastic base and extruding the molten thermoplastic material into the mould may contain salts, sugars or other water-soluble substances in solution. The salts may exert a swelling effect on the cellulose acetate or other thermoplastic base as do, for example, thiocyanates, perchlorates and some nitrates, chlorides, bromides and iodides. On the other hand, salts adapted to repress swelling may be employed, for example ammonium salts, sulphates, phosphates and thiosulphates. The water may contain small quantities of volatile solvents for the thermoplastic base, for example, in the case of cellulose acetate, acetone, dioxane, diacetone alcohol or methylene ethylene ether may be present in low concentration. Or liquids which are swelling agents for the thermoplastic base without being solvents therefor may be present. For instance, where the thermoplastic base is cellulose acetate, the water may contain methyl or ethyl alcohol in low concentration.

Instead of water, other liquid non-solvents for the thermoplastic base may be used, for example, in the case of cellulose acetate and similar organic derivatives of cellulose, benzene, toluene, the xylenes, petroleum ether and like liquid hydrocarbons, or non-solvent chlorinated hydrocarbons such as carbon tetrachloride, may be employed instead of or in addition to the water.

Having described my invention, what I desire to secure by Letters Patent is:

1. Process for the production of molded products having a basis of a synthetic thermoplastic film-forming substance, which comprises melting said substance beneath the surface of an inert liquid in a closed space, forcing the molten substance under pressure exerted by said liquid into a heated molding space already containing a body of said liquid, the molten substance entering the molding space beneath the surface of the liquid, and cooling the substance in the said molding space until it has set in the desired shape.

2. Process for the production of molded products having a basis of a synthetic water-insoluble thermoplastic film-forming substance, which comprises melting said substance beneath the surface of water in a closed space, forcing the molten substance under pressure exerted by said water into a heated molding space already containing a body of water, the molten substance entering the molding space beneath the surface of the water, and cooling the substance in the said molding space until it has set in the desired shape.

3. Process for the production of molded products having a basis of a synthetic water-insoluble thermoplastic film-forming substance, which comprises introducing said substance beneath the surface of a body of water in a closed space, blowing steam into said space until said substance has melted, forcing the molten substance under pressure exerted by steam through said water into a heated molding space already containing a body of water, the molten substance entering the molding space beneath the surface of the water, and cooling the substance in the said molding space until it has set in the desired shape.

4. Process for the production of molded products having a basis of a synthetic water-insoluble thermoplastic film-forming substance, which comprises introducing said substance beneath the surface of a body of water in a closed space, blowing steam into said space until said substance has melted, injecting a plasticizer for said substance into said space, intimately mixing said plasticizer with the molten substance to form a substantially homogeneous composition, forcing the molten composition under pressure exerted by steam through said water into a heated settling space containing water, the molten composition being introduced below the surface of the water, allowing said composition to settle out below the surface of the water, forcing the molten composition under steam pressure exerted through the water from said settling space into a heated molding space already containing a body of water, the molten substance entering the molding space beneath the surface of the water, and cooling the substance in the said molding space until it has set in the desired shape.

5. Process for the production of molded products having a basis of a synthetic thermoplastic film-forming substance comprising an organic derivative of cellulose, which comprises melting said substance beneath the surface of an inert liquid in a closed space, forcing the molten substance under pressure exerted by said liquid into a heated molding space already containing a body of said liquid, the molten substance entering the molding space beneath the surface of the liquid, and cooling the substance in the said molding space until it has set in the desired shape.

6. Process for the production of molded products having a basis of a synthetic water-insoluble thermoplastic film-forming substance comprising an organic derivative of cellulose, which comprises introducing said substance beneath the surface of a body of water in a closed space, blowing steam into said space until said substance has melted, injecting a plasticizer for said substance into said space, intimately mixing said plasticizer with the molten substance to form a substantially homogeneous composition, forcing the molten composition under pressure exerted by steam through said water into a heated settling space containing water, the molten composition being introduced below the surface of the water, allowing said composition to settle out below the surface of the water, forcing the molten composition under steam pressure exerted through the water from said settling space into a heated molding space already containing a body of water, the molten substance entering the molding space beneath the surface of the water, and cooling the substance in the said molding space until it has set in the desired shape.

7. Process for the production of molded products having a basis of a synthetic thermoplastic film-forming substance comprising cellulose acetate, which comprises melting said substance beneath the surface of an inert liquid in a closed space, forcing the molten substance under pressure exerted by said liquid into a heated molding space already containing a body of said liquid, the molten substance entering the molding space beneath the surface of the liquid, and cooling the substance in the said molding space until it has set in the desired shape.

8. Process for the production of molded products having a basis of a synthetic thermoplastic film-forming substance comprising cellulose acetate, which comprises melting said substance beneath the surface of water in a closed space, forcing the molten substance under pressure exerted by said water into a heated molding space already containing a body of water, the molten substance entering the molding space beneath the surface of the water, and cooling the substance in the said molding space until it has set in the desired shape.

9. Process for the production of molded products having a basis of a synthetic thermoplastic film-forming substance comprising cellulose acetate, which comprises introducing said substance beneath the surface of a body of water in a closed space, blowing steam into said space until said substance has melted, forcing the molten substance under pressure exerted by steam through said water into a heated molding space already containing a body of water, the molten substance entering the molding space beneath the surface of the water, and cooling the substance in the said molding space until it has set in the desired shape.

10. Process for the production of molded products having a basis of a synthetic water-insoluble thermoplastic film-forming substance comprising cellulose acetate, which comprises introducing said substance beneath the surface of a body of water in a closed space, blowing steam into said space until said substance has melted, injecting a plasticizer for said substance into said space, intimately mixing said plasticizer with the molten substance to form a substantially homogeneous composition, forcing the molten composition under pressure exerted by steam through said water into a heated settling space containing water, the molten composition being introduced below the surface of the water, allowing said composition to settle out below the surface of the water, forcing the molten composition under steam pressure exerted through the water from said settling space into a heated molding space already containing a body of water, the molten substance entering the molding space beneath the surface of the water, and cooling the substance in the said molding space until it has set in the desired shape.

11. Process for the production of molded products having a basis of a synthetic thermoplastic film-forming substance comprising cellulose acetate butyrate, which comprises melting said substance beneath the surface of an inert liquid in a closed space, forcing the molten substance under pressure exerted by said liquid into a heated molding space already containing a body of said liquid, the molten substance entering the molding space beneath the surface of the liquid, and cooling the substance in the said molding space until it has set in the desired shape.

12. Process for the production of molded products having a basis of a synthetic water-insoluble thermoplastic film-forming substance comprising cellulose acetate butyrate, which comprises melting said substance beneath the surface of water in a closed space, forcing the molten substance under pressure exerted by said water into a heated molding space already containing a body of water, the molten substance entering the molding space beneath the surface of the water, and cooling the substance in the said molding space until it has set in the desired shape.

13. Process for the production of molded products having a basis of a synthetic water-insoluble thermoplastic film-forming substance comprising cellulose acetate butyrate, which comprises introducing said substance beneath the surface of a body of water in a closed space, blowing steam into said space until said substance has melted, forcing the molten substance under pressure exerted by steam through said water into a heated molding space already containing a body of water, the molten substance entering the molding space beneath the surface of the water, and cooling the substance in the said molding space until it has set in the desired shape.

14. Process for the production of molded products having a basis of a synthetic water-insoluble thermoplastic film-forming substance comprising cellulose acetate butyrate, which comprises introducing said substance beneath the surface of a body of water in a closed space, blowing steam into said space until said substance has melted, injecting a plasticizer for said substance into said space, intimately mixing said plasticizer with the molten substance to form a substantially homogeneous composition, forcing the molten composition under pressure exerted by steam through said water into a heated settling space containing water, the molten composition being introduced below the surface of the water, allowing said composition to settle out below the surface of the water, forcing the molten composition under steam pressure exerted through the water from said settling space into a heated molding space already containing a body of water, the molten substance entering the molding space beneath the surface of the water, and cooling the substance in the said molding space until it has set in the desired shape.

HENRY DREYFUS.